United States Patent [19]

Rothon et al.

[11] Patent Number: 5,461,101
[45] Date of Patent: Oct. 24, 1995

[54] PARTICULATE MAGNESIUM HYDROXIDE

[75] Inventors: Roger N. Rothon, Guilden Sutton, England; Adrian M. Ryder, Stamullen; Anthony G. Bourke, Bettystown, both of Ireland

[73] Assignee: Defped Limited, Dublin, Ireland

[21] Appl. No.: 52,049

[22] Filed: Apr. 23, 1993

[30] Foreign Application Priority Data

Apr. 23, 1992 [IE] Ireland ..................................... 921328

[51] Int. Cl.⁶ ............................... C08K 3/22; C09C 1/02; C01F 5/08
[52] U.S. Cl. ........................... 524/436; 423/635; 423/636
[58] Field of Search ............................ 524/436; 423/635, 423/636

[56] References Cited

U.S. PATENT DOCUMENTS

| | | | |
|---|---|---|---|
| 2,658,814 | 11/1953 | Woodward | 423/636 |
| 4,098,762 | 7/1978 | Miyata | 524/400 |
| 4,505,887 | 3/1985 | Miyata et al. | 423/635 |
| 4,698,379 | 10/1987 | Nakaya et al. | 423/636 |
| 5,143,965 | 9/1992 | Mertz | 423/636 |

FOREIGN PATENT DOCUMENTS

| | | |
|---|---|---|
| 0365347 | 4/1990 | European Pat. Off. |
| 0393813 | 10/1990 | European Pat. Off. |
| WO092005113 | 4/1992 | WIPO |

OTHER PUBLICATIONS

Abstract of Japan 1–245 039 Published Sep. 29, 1988.
Abstract of Japan 61–031446 Published Feb. 13, 1986.
Abstract of Japan 61–247746 Published Nov. 5, 1986.
Abstract of Japan 1–131022 Published May 23, 1989.
Abstract of Japan 2–048,414 Published Feb. 19, 1990.

*Primary Examiner*—Veronica P. Hoke
*Attorney, Agent, or Firm*—Hiro, Scavone, Haller & Niro

[57] ABSTRACT

The invention relates to particulate magnesium hydroxide suitable for use as a flame retardant additive for a polymer which has a BET surface area of 13–30 $m^2/g$ and an average particle size ($D_{50}$) of 0.3–1.0 micron.

The invention also relates to a process for producing a particulate magnesium hydroxide having a BET surface area of 13–30 $m^2/g$ and an average particle size ($D_{50}$) of 0.3–1.9 micron by calcining a magnesium feedstock to magnesium oxide having a BET surface area of 3–10 $m^2/g$; hydrating the magnesium oxide to a magnesium hydroxide hydration product in the absence of added catalyst; and milling the magnesium hydroxide hydration product.

The invention further relates to a polymeric article containing particulate magnesium hydroxide according to the invention.

11 Claims, No Drawings

PARTICULATE MAGNESIUM HYDROXIDE

The invention relates to particulate magnesium hydroxide suitable for use as a flame retardant additive for a polymer and to a process for its production.

The term "particulate magnesium hydroxide" is intended to embrace substantially dry particulate magnesium hydroxide, which is in the form of a powder, as well as, particulate magnesium hydroxide dispersed in a suspension, which is in the form of a slurry.

The term "polymer" is intended to embrace amorphous polymers including, for example, ethylene propylene diene monomer (EPDM) rubber; amorphous or low crystallinity polymers including, for example, ethylene vinyl acetate (EVA) and ethylene methylacrylate copolymer (EMA); as well as, medium crystallinity polymers including, for example, polyamides, polyethylenes and polypropylene homopolymers and copolymers.

Metal hydroxides function as flame retardant additives for polymers due to their endothermic decomposition with the release of water. Use of these materials is growing due to their environmentally attractive nature compared with alternative flame retardant additives such as halogenated compounds. To date, the material of choice has been aluminium hydroxide but there is increasing interest in magnesium hydroxide due to its better thermal stability at processing temperatures, together with its ability to endothermically decompose, releasing water, at polymer pyrolysis temperatures.

Average particle size ($D_{50}$) as used herein is measured by light scattering methods on an aqueous dispersion of the powder. Average particle size ($D_{50}$) is defined as the diameter (in microns) of the particles at which 50% by volume of the particles have a diameter greater than that figure and 50% by volume of the particles have a diameter less than that figure. For particulate magnesium hydroxide of the present invention, the shape of the particle size distribution and the average particle size observed can vary markedly with the method used for its determination. For the purposes of the present invention, the average particle size values given herein are the volume average sizes ($D_{50}$) determined by a Master Sizer X (Trade Mark) instrument manufactured by Malvern Instruments Ltd., Malvern, United Kingdom. Measurements are carried out on an aqueous dispersion of the powder using a dispersant (Dispex (Trade Mark) A40 manufactured by Allied Colloids of Bradford, Yorkshire, United Kingdom) and according to the manufacturer's instructions. Pump setting is 50%, stirrer setting 50% and ultrasonic setting 100%. It is found that with some powders the average particle size ($D_{50}$) varies considerably with duration of ultrasonic treatment. Ultrasonic treatment is used to break up agglomerates and all measurements referred to herein were obtained after 2–5 minutes of ultrasonic treatment. The presentation numbers used in calculating the values are 20 (HD) 1.330, 1.530 and 0.10000 and a lens with a focus of 45 mm is used.

Particle surface area as used herein is measured by the BET method developed by Brunauer, Emmett and Teller, as described by S. Brunauer, P. H. Emmett and E. J. Teller in the Journal of the American Chemical Society 60, 309 (1938).

Additives such as magnesium hydroxide have to be used at high loadings (50%–65% (w/w)) for optimal flame retardant performance. This can adversely affect the polymer properties of the polymeric article.

The term "polymeric article" embraces articles having flame retardant properties, the articles being in the form of pressed sheets and bars, extrusions, injection moulded shapes and surface coatings especially for wires and cables. The polymeric articles are formed by mixing particulate magnesium hydroxide according to the present invention with a polymer, followed by extrusion and/or compression or injection moulding.

The term "polymer properties" is intended to embrace properties of polymeric articles including, for example, flame retardant effectiveness, tensile strength and % elongation, as well as, the dispersability of the particulate magnesium hydroxide in the polymeric article.

Prior art methods of producing particulate magnesium hydroxide include:

(i) Adding lime to sea-water.

This produces magnesium hydroxide with a BET surface area which is usually above 15 $m^2/g$ and is often over 30 $m^2/g$. The BET surface area is in the range 10–40 $m^2/g$ and the particle size ($D_{50}$) is in the range 2–10 micron—such products give poor results in polymeric articles.

(ii) Adding a base, such as ammonium, sodium or calcium hydroxide, to a solution of a magnesium salt.

This usually produces magnesium hydroxide with a high BET surface area (>25 $m^2/g$). Under special conditions, magnesium hydroxide powders with a particle size ($D_{50}$) of 0.5–1.5 micron can be obtained, but these powders have a BET surface area in the range 3–10 $m^2/g$—such powders are effective flame retardant additives but their polymer properties, e.g. tensile strength, are not adequate. Furthermore, such powders are relatively expensive to produce, since extensive washing of the precipitate is required to remove co-product (ammonium, sodium or calcium salt).

(iii) Hydration of magnesium oxide produced by pyrolysis or calcination.

To date, hydration of magnesium oxide produced by pyrolysis of a magnesium salt solution, for example, magnesium chloride, has been the favoured process although this method is relatively expensive to carry out. Hydration of magnesium oxide, produced by pyrolysis of magnesium chloride, typically yields a magnesium hydroxide powder having a BET surface area of <12 $m^2/g$ and an average particle size ($D_{50}$) of 0.8–1.3 micron.

Hydration of magnesium oxide produced by calcination of magnesium hydroxide or magnesium carbonate is potentially attractive as there is no by-product to remove. The degree of calcination used determines the surface area of magnesium hydroxide powder. Mild calcination gives magnesium oxide with a BET surface area of at least 25 $m^2/g$ (often >50 $m^2/g$). Such magnesium oxide hydrates easily but gives a magnesium hydroxide powder with a similarly high BET surface area.

Hard calcination gives a magnesium oxide with a large particle size ($D_{50}$) and a low BET surface area (often <1 $m^2/g$). This magnesium oxide is extremely difficult to hydrate, unless a catalyst such as magnesium chloride is used. When a catalyst is used, the product usually comprises particles of relatively large particle size ($D_{50}$) and high BET surface area. Milling of such particles reduces their particle size ($D_{50}$) but increases their BET surface area still further. Under these conditions the particles produced are unsuitable for use as a flame retardant additive.

It is desirable to obtain a particulate magnesium hydroxide with a size and shape distribution that optimise the conflicting demands of the various polymer properties.

It is also desirable to develop economic routes to such a particulate magnesium hydroxide.

According to the invention there is provided a particulate magnesium hydroxide having a BET surface area of 13–30 $m^2/g$ and an average particle size ($D_{50}$) of 0.3–1.0 micron.

We have surprisingly discovered that a particulate magnesium hydroxide according to the present invention, when mixed with a polymer to form a polymeric article, exhibits optimal polymer properties of the polymeric article.

Particulate magnesium hydroxide according to the invention may optionally be coated with an agent selected from a fatty acid, e.g. stearic acid or oleic acid, a carboxylated unsaturated polymer, an organosilane, e.g. 3-aminopropyltriethoxysilane, an organotitanate or a salt thereof. Such a coated particulate magnesium hydroxide is particularly useful as a flame retardant additive for amorphous and low crystallinity polymers, e.g., ethylene vinyl acetate and ethylene methylacrylate copolymer.

The invention also provides a process for producing a particulate magnesium hydroxide for use as a flame retardant additive for a polymer, the particulate magnesium hydroxide having a BET surface area of 13–30 $m^2/g$ and an average particle size ($D_{50}$) of 0.3–1.9 micron, which process comprises calcining a magnesium feedstock to magnesium oxide having a BET surface area of 3–10 $m^2/g$; hydrating the magnesium oxide to a magnesium hydroxide hydration product in the absence of added catalyst; and milling the magnesium hydroxide hydration product to produce the particulate magnesium hydroxide.

The term "magnesium feedstock" is intended to embrace magnesium hydroxide and magnesium carbonate, as well as, any other material which will yield magnesium oxide after calcination.

The process according to the invention for producing a particulate magnesium hydroxide may involve:

(i) calcining the magnesium feedstock to produce magnesium oxide with a BET surface area of 3–10 $m^2/g$, preferably 3–7 $m^2/g$;

(ii) hydrating the magnesium oxide in the absence of added catalyst to form a granular magnesium hydroxide with a BET surface area of 3–10 $m^2/g$. The hydration step involves reacting 50–300 g of magnesium oxide per liter of water in an agitated vessel at a temperature of 60°–99° C. The hydration reaction is continued for at least 10 hours, and preferably 15 hours;

(iii) optionally screening the hydration product through a 200 micron screen;

(iv) optionally filtering and washing the granular hydration product and reslurrying the hydration product;

(v) milling or, preferably, wet-milling the hydration product to produce a slurry containing magnesium hydroxide particles with an average particle size ($D_{50}$) of 0.3–1.9 micron and a BET surface area of 13–30 $m^2/g$; and (vi) optionally drying and pin-milling the slurry to obtain a particulate magnesium hydroxide having a BET surface area of 13–30 $m^2/g$ and an average particle size ($D_{50}$) of 0.3–1.9 micron.

We have discovered that a magnesium oxide with a BET surface area of 3–10 $m^2/g$, which is produced by calcination conditions intermediate between mild and hard calcination, allows hydration to proceed readily and, after milling, gives a particulate magnesium hydroxide having a BET surface area of 13–30 $m^2/g$ and an average particle size ($D_{50}$) of 0.3 to 1.9 micron. The intermediate calcination conditions required to produce such a magnesium oxide with a BET surface area of 3–10 $m^2/g$ will vary with the equipment used. We have surprisingly discovered that a particulate magnesium hydroxide produced by a process according to the present invention exhibits optimal polymer properties.

Any magnesium hydroxide raw material, with a purity of >95% (based on MgO), could serve as the magnesium feedstock for the calcination step. Relatively fine magnesium hydroxide raw material is preferred, e.g., magnesium hydroxide having a particle size ($D_{50}$) below 100 micron and a BET surface area in the range 5–75 $m^2/g$. Magnesium hydroxide raw material with low levels of transition element impurities is preferred. Magnesium hydroxide raw material with a low combined level of $Fe_2O_3$ and $Mn_3O_4$ is particularly preferred.

Alternatively, magnesium carbonate may be used, in place of magnesium hydroxide, as the magnesium feedstock for the calcination step.

The hydration conditions are not critical but a relatively high concentration of magnesium oxide and a temperature of over 70° C. are preferred for economical reasons. Such hydration conditions produce magnesium hydroxide particles that are too large for additive use and are often very gritty, so that the particle size ($D_{50}$) is difficult to measure. Wet milling, using e.g. a bead mill, yields the required particle size ($D_{50}$). During bead milling, the BET surface area of the magnesium hydroxide increases somewhat—this should be allowed for when the original magnesium oxide is being produced by calcination.

A variety of procedures and equipment may be used to carry out the calcination and wet milling stages. Especially useful calcination equipment are multi-hearth furnaces and rotary kilns. Bead and sand mills are suitable wet milling equipment. A variety of drying methods can be used including tray drying, belt drying and spray drying.

Coatings may be applied to inorganic fillers, such as particulate magnesium hydroxide, to improve their compatibility and interaction with polymers. Typical coatings are fatty acids (saturated or unsaturated aliphatic monocarboxylic acids), carboxylated unsaturated polymers (for example, carboxylated polybutadiene), organosilanes and organotitanates. The fatty acids and carboxylated polymers can be added from water as the ammonium or sodium salt. The fatty acids may also be coated by dry blending as can organosilanes and organotitanates. In many instances, coating can also be effected by adding the particulate magnesium hydroxide and coating agent(s) separately at the polymer compounding sedge. When organosilanes are used as the coating agent, then 1–3% by weight is usually sufficient and to obtain optimum effect it is recommended that they are physically mixed with the particulate magnesium hydroxide immediately before compounding. For carboxylated unsaturated polymers as the coating agent, it is recommended that they are used at 1–5% by weight and either precoated onto the particulate magnesium hydroxide or added directly to the polymer during compounding. The use of coatings affects the average particle size ($D_{50}$) and BET surface area as defined herein. All average particle size ($D_{50}$) and BET surface area measurements referred to herein were carried out before the coating, if present, is applied.

In addition to the polymer, particulate magnesium hydroxide and coating agent(s), the polymeric articles may contain other customarily used additives. As examples of such additives it is possible to cite antioxidants, UV ray absorbing agents, antistatic agents, lubricants, pigments, plasticisers, organohalogen flame retardants, red phosphorus flame retardants and other flame retardants such as aluminium hydroxide and Ultracarb (Trade Mark, Microfine Minerals, Derbyshire, United Kingdom), other additives such as carbon black and calcium carbonate, cross-linking agents and the like.

The invention further provides a polymeric article containing a particulate magnesium hydroxide according to the present invention or a particulate magnesium hydroxide produced by a process according to the present invention.

EXAMPLES I–VII

All of these examples were carried out with an optimised magnesium hydroxide feed material obtained by liming of sea-water—the conditions are controlled to produce a magnesium hydroxide with a BET surface area of 14 $m^2/g$. The magnesium hydroxide is then further refined by classification (hydrocyclone), to remove magnesium hydroxide particles having a particle size ($D_{50}$) of greater than 10 micron, since it is believed that such particles may be detrimental to many polymeric materials. The magnesium hydroxide feed material thus obtained had a BET surface area of 14 $m^2/g$ and an average particle size ($D_{50}$) of 4.2 micron. This magnesium hydroxide feed material had the following impurity levels:

| Impurity | Concentration (% (w/w)) (based on Mg(OH)$_2$) |
| --- | --- |
| SiO$_2$ | 0.08 |
| Al$_2$O$_3$ | 0.03 |
| Fe$_2$O$_3$ | 0.05 |
| Mn$_3$O$_4$ | 0.02 |
| CaO | 1.00 |

The feed material was only moderately useful as a flame retardant additive for polymers.

Example I

The magnesium hydroxide feed material was calcined in a gas-fired furnace (Model GF1, manufactured by The Furnace Construction Company Ltd., of Units 15/16, Newton Moar Industrial Estate, Hyde, Cheshire SK14 4LS, England) at a temperature of 1050°–1100° C. for a period of 5½ hours, until the BET surface area of the magnesium oxide had fallen to 5 $m^2/g$.

After cooling, the magnesium oxide was added with constant stirring, at a concentration of 200 g/l, to de-ionised water at 90° C. The hydration reaction was allowed to continue for 15 hours and the slurry was then cooled for a further 9 hours. The hydration product had a weight loss on ignition of over 30% (w/w) (determined after heating for 30 minutes at 950° C.), showing that conversion to magnesium hydroxide was virtually complete. The material was granular with many agglomerates over 100 micron and was unsuitable for use as a flame retardant additive for polymers.

The hydration product was screened through a 200 micron screen—the screening step removes more than 10% (w/w) of the hydration product. After screening, the hydration product was filtered and washed to remove soluble impurities, slurried with water to a concentration of 20% (w/w) and then wet milled, by passing the slurry through a bead mill (Dyno Mill (Trade Mark) from Glen Creston Ltd., of 16 Dalston Gardens, Stanmore, Middlesex HA7 1DA, England). The Dyno Mill had a 15 liter chamber and contained 12 liters of 1 mm glass beads.

The thin cream-like output from the Dyno Mill was spread into trays and dried in an oven at 160° C. to constant weight before pin-milling. The particulate magnesium hydroxide according to the invention thus obtained had a BET surface area of 18 $m^2/g$ and an average particle size ($D_{50}$) of 0.8 micron.

Example II

The procedure is as for Example I, except that, before calcination, the feed material was filtered, washed, doped to 1.5% (w/w) chloride with magnesium chloride (to aid calcination), tray dried at 120° C. and deagglomerated in a Hosokawa Super Micron (Trade Mark) mill. The feed material was then calcined in a gas-fired indirect rotary calciner (APV Pasilac) at a temperature of approximately 1100° C. to produce a magnesium oxide with a BET surface area of 5–7 $m^2/g$. Hydration, filtering, washing, reslurrying, wet milling, tray drying and pin-milling are as for Example I. However, no 200 micron screening step was employed. The particulate magnesium hydroxide produced by a process according to the invention had a BET surface area of 25 $m^2/g$ and an average particle size ($D_{50}$) of 1.25 micron.

Example III

The chloride doped feed material is produced as for Example II. Calcination was then carried out in a gas-fired multiple hearth furnace (Sim-Chem, Cheshire, United Kingdom) containing seven hearths. The hottest hearth was maintained at about 1100° C. and magnesium oxide was produced with a BET surface area of 3–6 $m^2/g$.

Hydration is as in Example I and the hydrated slurry was passed through a 200 micron screen, filtered, washed, reslurried to a concentration of 20% (w/w) and passed through the bead mill (Dyno Mill from Glen Creston Ltd.. The Dyno Mill has a 15 liter chamber, containing 9 liters of 1 mm glass beads.). After wet milling, the slurry was a thin cream which was tray dried and pin-milled. The particulate magnesium hydroxide produced by a process according to the invention had a BET surface area of 14 $m^2/g$ and an average particle size ($D_{50}$) of 1.16 micron.

Example IV

The procedure followed is as in Example III but the bead mill (Dyno Mill) contained 12 liters of 1 mm glass beads. The resulting particulate magnesium hydroxide according to the invention had a BET surface area of 22 $m^2/g$ and an average particle size ($D_{50}$) of 0.59 micron.

Example V

A particulate magnesium hydroxide is produced as in Example III, except that a hot solution of sodium stearate (80° C.) was added to the slurry (5% (w/w) stearate based on Mg(OH)$_2$) before wet-milling.

Example VI

A particulate magnesium hydroxide is produced as in Example V, except that the concentration of sodium stearate used was altered to 2.5% (w/w) based on Mg(OH)$_2$.

Example VII

A particulate magnesium hydroxide is produced as in Example V, except that 5% ((w/w) based on Mg(OH)$_2$) sodium oleate was used instead of sodium stearate.

EXAMPLE VIII

A different magnesium hydroxide feed material was used for this example. It was also produced by liming of sea water and had a BET surface area of 10 m$^2$/g and an average particle size (D$_{50}$) of 2.8 micron. This magnesium hydroxide feed material had the following impurity levels:

Impurity Concentration (%(w/w))

| Impurity | Concentration (% (w/w)) (based on Mg(OH)$_2$) |
|---|---|
| SiO$_2$ | 0.11 |
| Al$_2$O$_3$ | 0.03 |
| Fe$_2$O$_3$ | 0.03 |
| Mn$_3$O$_4$ | 0.00 |
| CaO | 1.08 |

Like the feed material used in Examples I–VII, this feed material was only moderately useful as a flame retardant additive for polymers.

This feed material was doped to 1.5% (w/w) chloride with magnesium chloride and calcined as a 50% (w/w) solids slurry in a 0.2 ton per hour multiple hearth furnace to produce a magnesium oxide with a BET surface area of 3–7 m$^2$/g.

This magnesium oxide was converted to magnesium hydroxide by adding the magnesium oxide to process water at ambient temperature at a nominal concentration of 200g MgO per liter. The resulting slurry was heated to 60° C. for 48 hours. (More than 98% of the hydration product would pass through a 200 micron screen—a screening step is not usually employed in the procedure of Example VIII.) The hydration product is filtered and washed on a rotary vacuum filter, decantation washed, wet milled using a sand mill, spray dried using a Niro (Trade Mark) F35 BBD 6E spray drier and deagglomerated using a Hosokawa Super Micron (Trade Mark) mill. The resulting particulate magnesium hydroxide according to the invention had a BET surface area of 14 m$^2$/g and an average particle size (D$_{50}$) of 0.52 micron.

EXAMPLE IX

Magnesium hydroxide according to the invention prepared in Example I and the magnesium hydroxide feed material used in Example I were then incorporated into respective thermoplastic polymeric articles containing ethylene vinyl acetate. The polymeric articles in the form of pressed sheets were prepared by twin roll milling and compression moulding using procedures and equipment well known in the art. The composition of these formulations is set out in Table 1. (Flectol Pastilles (Trade Mark) is an antioxidant supplied by Monsanto.)

TABLE 1

| Formulation | |
|---|---|
| 18% Ethylene Vinyl Acetate (EVA) | 100 parts by weight |
| Magnesium Hydroxide | 150 parts by weight |
| 3-Aminopropyltriethoxysilane | 4.5 parts by weight |
| Flectol Pastilles | 1.0 part by weight |

Samples were then cut from the respective pressed sheets, for determination of various polymer properties. Tensile strength and % elongation of the polymeric articles are measured as described in British Standard Specification BS 2782, Part 3, Method 320A 1976 (1986). Flame retardant effectiveness is measured by oxygen index (% (v/v)), as described in British Standard Specification BS 2782. Table 2 compares the product prepared in Example I with its feed material and illustrates the improved polymer properties of the particulate magnesium hydroxide of the present invention.

TABLE 2

| Magnesium Hydroxide | BET Surface Area (m$^2$/g) | Particle Size D$_{50}$ (micron) | Tensile Strength (mPa) | Elongation (%) | Oxygen Index (%) |
|---|---|---|---|---|---|
| Optimised Prior Art (feedstock for process of Example I) | 14 | 4.2 | 12.4 | 140 | 34 |
| Product of Example I | 18 | 0.8 | 17.1 | 151 | 34 |

EXAMPLE X

A typical prior art magnesium hydroxide is produced by liming of sea-water. Such magnesium hydroxide is an intermediate in refractory magnesia production.

Such a typical prior art magnesium hydroxide and the particulate magnesium hydroxide according to the invention prepared in Example I were incorporated into respective thermoplastic polymeric articles containing ethylene vinyl acetate. The polymeric articles in the form of pressed sheets were prepared by twin roll milling and compression moulding using standard procedures and equipment. The composition of the polymeric articles is set out in Table 3.

TABLE 3

| Formulation | |
|---|---|
| 18% Ethylene Vinyl Acetate (EVA) | 100 parts by weight |
| Magnesium Hydroxide | 150 parts by weight |
| Flectol Pastilles | 1 part by weight |

Samples were then cut from the respective pressed sheets for the determination of various polymer properties. The improvement in performance of particulate magnesium hydroxide according to the present invention, when compared with a typical prior art magnesium hydroxide, is illustrated in Table 4. Tensile strength, % elongation and flame retardant effectiveness are measured as described in British Standard Specification No. BS 2782.

TABLE 4

| Magnesium Hydroxide | BET Surface Area (m²/g) | Particle Size $D_{50}$ (micron) | Tensile Strength (mPa) | Elongation (%) | Oxygen Index (%) |
|---|---|---|---|---|---|
| Typical Prior Art | 35 | 3 | 8.2 | 90 | 32 |
| Product of Example I | 18 | 0.8 | 14.7 | 120 | 34 |

EXAMPLE XI

Coated particulate magnesium hydroxide prepared according to each of Examples V–VII was compounded into a polypropylene copolymer (Valtec (Trade Mark) CG 108, Himont UK Ltd.) using a commercial twin screw compounder (APV MP2030) at nominal powder loadings of 55, 60 and 65% (w/w). The compounded polymer was injection-moulded (Negri-Bossi (Trade Mark) NB55) into polymeric articles in the form of tensile test bars (BS2787: Part 3: Method 320B: 1976) and these test bars were sawn into lengths appropriate for carrying out the Underwriter's Laboratory (Tests for Flammability of Plastics Materials—UL94, 1980) Vertical Burn test. All these polymeric articles gave a $V_0$ rating in this test at 3 mm nominal thickness, indicating excellent flame retardant performance.

EXAMPLE XII

Particulate magnesium hydroxide according to the invention prepared in Example I was compounded into a commercial grade of polyamide (Nylon 6) using a co-rotating commercial twin screw compounder (Betol (Trade Mark)) at nominal powder loadings of 53, 59 and 65% (w/w). The compounds were injection-moulded into polymeric articles in the form of bars suitable for the determination of flame retardant performance, the results of which were:

| Nominal Powder Loading % (w/w) | Oxygen Index % (w/w) |
|---|---|
| 53 | 55 |
| 59 | 72 |
| 65 | 73 |

This polymeric article gave an excellent flame retardant performance.

EXAMPLE XIII

Particulate magnesium hydroxide according to the invention prepared in Example I was incorporated into a commercial grade of ethylene methylacrylate copolymer (EMA—Lotryl (Trade Mark) 1025 MN5 from Atochem) using standard twin roll mill and compression moulding procedures. The composition used is set out in Table 5.

TABLE 5

| Formulation | |
|---|---|
| EMA | 100 parts by weight |
| Magnesium Hydroxide | 100 parts by weight |
| 3-Aminopropyltriethoxysilane | 1.0 part by weight |
| Flectol Pastilles | 1.0 part by weight |

Compression moulding was at 160° C. and the polymeric article thus produced had an oxygen index of 27.2% (v/v), a tensile strength of 8.3 mPa and an elongation at break of 330%.

EXAMPLE XIV

Example XIII was repeated except that the level of magnesium hydroxide was increased to 150 parts by weight and the level of 3-aminopropyltriethoxysilane was increased to 1.5 parts by weight. When compression moulded at 160° C. the polymeric article thus produced had an oxygen index of 30.8% (v/v), a tensile strength of 9.6 mPa and an elongation at break of 145%. When compression moulded at 250° C., the tensile strength increased to 13.4 mPa but the elongation at break fell to 130%.

EXAMPLE XV

Particulate magnesium hydroxide according to the invention prepared in Example I was incorporated into polymeric articles containing ethylene vinyl acetate. The polymeric articles were prepared by twin roll milling and compression moulding using standard procedures and equipment. The compositions of the polymeric articles are set out in Table 6:

TABLE 6

| | FORMULATION | | | |
|---|---|---|---|---|
| | A | B | C | D |
| EVA (28% Vinyl Acetate) | 100 | 100 | 100 | 100 |
| Magnesium Hydroxide | 125 | 125 | 125 | 125 |
| Rhenogran P50 | 3 | 3 | 3 | 3 |
| Perkadox 14-40B | 6 | 6 | 6 | 6 |
| Vinyl-tris(2-methoxyethoxy silane) | 0 | 1.3 | 2.5 | 0 |
| Atlas G-3965 | 0 | 0 | 0 | 2.5 |

Perkadox (Registered Trade Mark) is a peroxide curing agent supplied by Akzo Chemicals. Atlas (Trade Mark) G-3965 is a carboxylated polybutadiene supplied by Imperial Chemical Industries. Rhenogran (Registered Trade Mark) P50 is a hydrolysis stabiliser supplied by Rhein Chemie Rheinau GmbH of Mannheim, Germany.

Samples were then cut from the respective polymeric articles for the determination of various polymer properties (see Table 7). Tensile strength, % elongation and flame retardant effectiveness are measured as described in British Standard Specification No. BS 2782.

TABLE 7

| | FORMULATION | | | |
|---|---|---|---|---|
| | A | B | C | D |
| Tensile Strength (mPa) | 12.9 | 20.5 | 22.7 | 19.6 |
| Elongation at Break | 224.0 | 161.0 | 127.0 | 148.0 |

TABLE 7-continued

| | FORMULATION | | | |
|---|---|---|---|---|
| | A | B | C | D |
| (%) Oxygen Index (%) | 37.5 | 32.4 | 31.0 | 30.2 |

We claim:

1. A flame retardant additive for a polymer, comprising: a particulate magnesium hydroxide, said magnesium hydroxide particles having a BET surface area of 13–20 $m^2/g$ and an average size ($D_{50}$) of 0.527–1.0 micron.

2. A flame retardant additive according to claim 1 wherein said particulate magnesium hydroxide is coated with an agent selected from the group consisting of a fatty acid, an organosilane, an organotitanate, a carboxylated unsaturated polymer and salt thereof.

3. A process for producing a flame retardant additive for a polymer, comprising the steps of:

calcining a magnesium feedstock to magnesium oxide having a BET surface area of 3–10 $m^2/g$;

hydrating said magnesium oxide to a magnesium hydroxide hydration product in the absence of added catalyst; and milling said magnesium hydroxide hydration product to produce said flame retardant additive comprising a particulate magnesium hydroxide having a BET surface area 13–30$^2$/g and an average particle size ($D_{50}$) of 0.3–1.9 micron.

4. A process according to claim 3, in which the magnesium hydroxide hydration product is wet-milled to produce the particulate magnesium hydroxide.

5. A process according to claim 3, in which the magnesium feedstock is magnesium hydroxide.

6. A process according to claim 3, in which the magnesium feedstock is calcined to magnesium oxide having a BET surface area of 3–7 $m^2/g$.

7. A process according to claim 3, in which the magnesium hydroxide hydration product is, before milling, screened through a 200 micron screen.

8. A process according to claim 3, in which the magnesium hydroxide hydration product, after milling, is dried and pin-milled.

9. A process according to claim 3, in which the particulate magnesium hydroxide is coated with an agent selected from the group consisting of a fatty acid, an organosilane, an organotitanate, a carboxylated unsaturated polymer and a salt thereof.

10. A polymeric article containing a flame retardant additive comprising a particulate magnesium hydroxide according to claim 1.

11. A polymeric article containing a flame retardant additive comprising a particulate magnesium hydroxide produced by a process comprising the steps of:

calcining a magnesium feedstock to magnesium oxide having a BET surface area of 3–10 $m^2/g$;

hydrating said magnesium oxide to a magnesium hydroxide hydration product in the absence of added catalyst; and milling said magnesium hydroxide hydration product to produce said flame retardant additive comprising a particulate magnesium hydroxide having a BET surface area 13–30$^2$/g and an average particle size ($D_{50}$) of 0.3–1.9 micron.

* * * * *